Sept. 12, 1933.   A. L. CHESLEY   1,926,035
METHOD OF TREATING TOBACCO
Original Filed Feb. 21, 1930   2 Sheets-Sheet 1
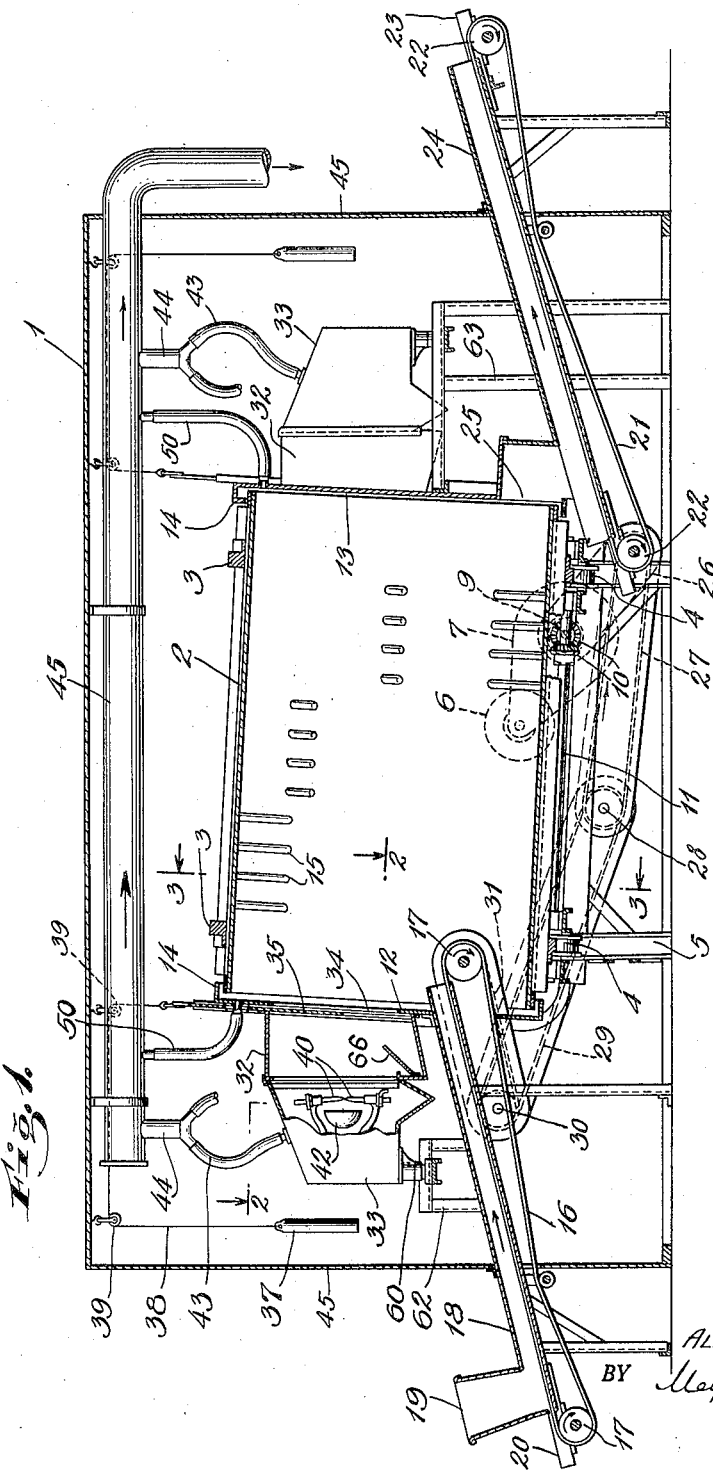
INVENTOR.
ALMOND L. CHESLEY
BY *Meyers & Jones*
ATTORNEYS.

Sept. 12, 1933.    A. L. CHESLEY    1,926,035
METHOD OF TREATING TOBACCO
Original Filed Feb. 21, 1930    2 Sheets-Sheet 2
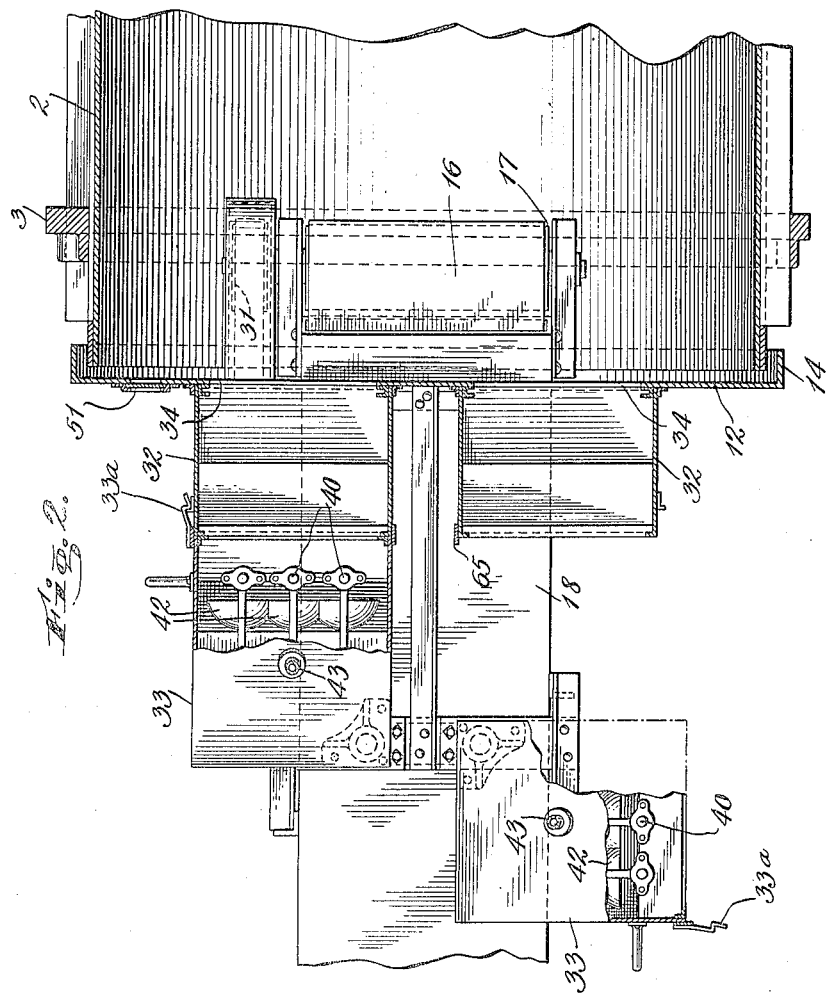
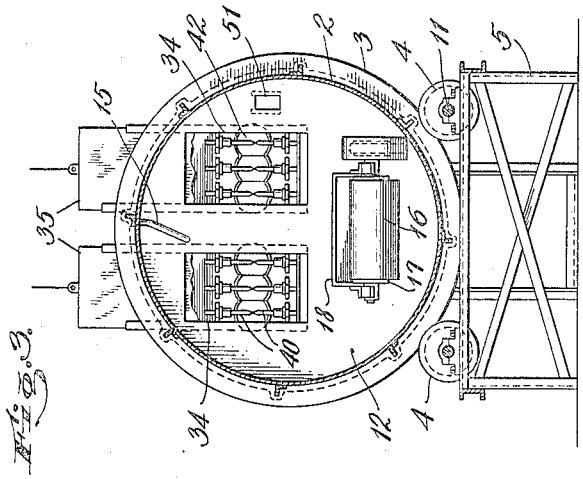
INVENTOR.
ALMOND L. CHESLEY
BY Meyers & Jones
ATTORNEYS.

Patented Sept. 12, 1933

1,926,035

UNITED STATES PATENT OFFICE 1,926,035

METHOD OF TREATING TOBACCO

Almond L. Chesley, Richmond, Va., assignor to The American Tobacco Company, New York, N. Y., a corporation of New Jersey Application February 21, 1930, Serial No. 430,312
Renewed November 22, 1932

13 Claims. (Cl. 131—6)

This invention is an improvement in methods of treating tobacco, and more particularly in a method or process for improving the quality of cured and aged tobacco.

Curing tobacco presents problems different from those met with in the curing of other materials. Usually the curing is a process of gradually reducing the natural moisture content, plant juice or sap, to an extent such that the tobacco will not be affected by mold during storage. In stored tobacco, the plant life apparently is not destroyed entirely, becoming active again between the months of May and September, at which time heat is produced, and further chemical changes or reactions take place.

Such changes are known as sweats, and they will occur periodically, year after year.

When cured by usual processes, tobacco is subject to variations in quality, due in part to the manner of harvesting, which produces a mixture of ripe, unripe and overripe leaves, and in part to the condition of the tobacco at the time of harvesting, and climatic conditions occurring during growth and curing. An average is usually the best that is possible to obtain, and this average varies from year to year.

Even after it has been cured and aged under the best practical conditions, some of it still contains a certain quantity of those ingredients which produce "bite".

I have discovered that treatment of tobacco, when it is properly conditioned, with ultra-violet rays, improves its quality. These rays aid chemical reactions in plant life, and some of the reactions will not take place in their absence. Sunlight includes ultra-violet rays, but its use in tobacco treatment is not practical.

Natural sunlight is not intense enough to give the best results, except when used over long periods of time, and intervening rainy and cloudy days make it impossible to handle large quantities of tobacco, such as is necessary in modern methods of processing, within a reasonable time. In addition, sunlight acts to dry out the tobacco, so that the leaves become broken, and are not suitable for manufacture. The ultra-violet rays will not penetrate an opaque material, such as tobacco, to any great depth. For this reason, any usual treatment by natural sunlight or by electrically produced ultra-violet rays would not produce results, because of the small area of the leaf surface which could be subjected to their action. I have discovered that when tobacco is treated with ultra-violet rays, other than natural sunrays, in selected conditions including moisture content, temperature, etc., and in such manner that substantially every portion of the leaf surface is subjected to the impact of the rays, there is a marked improvement in the qualities of the tobacco, the eventual product being mellow, even and suitable for any purpose.

I have also discovered that with the ultra-violet rays, there should be a proportion of the infrared rays, which penetrating the leaf, raise the internal temperature thereof, and that the preferred source of the rays is a carbon arc, with a composition of carbon of a nature such that the light includes a selected proportion of ultra-violet and infrared rays.

In carrying out the improved method, the moisture content of the tobacco is first regulated to between about 8% to 18%, preferably in the neighborhood of 15%, this content being sufficient for the natural plant life, dormant in the leaf, to became active. The moisture serves two purposes; the first being the solution of the chemical compounds contained in the cells of the plant, in which form such compounds become ionized, to have free acid and other radicals. In this condition, it becomes easy to disturb the equilibrium under which they exist, causing some of them to be destroyed and eliminated, and second, it puts the leaf in "case", so that it does not become broken or disintegrated during the process.

Next the tobacco is subjected to the action of light rays of a selected character, for a relatively short period of time, while the leaves are continuously turned over and over, to continuously expose fresh surfaces thereof to the action of the rays, the treatment conditions being such that the moisture content of the tobacco is not appreciably reduced when undergoing treatment. The tobacco during treatment may be in leaf form, or it may be partly manufactured, as for instance, by shredding.

It is also desirable to have some circulation of air over and through the tobacco while it is undergoing the action of the rays, to remove gaseous compounds which may be formed, thus to prevent their absorption by the tobacco, and the establishment of an equilibrium, and to provide oxygen for those processes which may be of an oxidation nature, this apparently being the class of reaction carried on by the plant itself. When the tobacco being treated is moving in one direction, that is, is traveling, a sufficient circulation of air is obtained.

The changes the tobacco undergoes are promoted by some elevation of the temperature, to about 70° F. This temperature serves to increase the solubility of the salts, and the rate of their diffusion through the plant cells. The temperature may reach 150° if desired for any reason. The light preferably includes a relatively large quantity of ultra-violet rays, a relatively small quantity of the visible light rays, and a relatively small quantity of the pentrating infrared rays. In this composition, practically all of the useful wave lengths of the sun are included.

The penetrating infrared rays enter the cell structures, imparting to them the natural heat energy necessary to carry on the processes which are promoted by the action of the ultra-violet light. The treatment with the light lasts from one to fifteen minutes, according to the condition of the tobacco, and the amount of bite it contains. The length of time is also proportional to the power of the light source.

After treatment, the tobacco may be stored in bulk, but the moisture content must be reduced sufficiently by artificial heat or otherwise, to prevent the formation of mold. The tobacco may be used immediately after treatment, but better results are given by storing it for twenty-four hours, so that any formed gases may escape.

Arc lamps are preferably used, and the carbons used in the arcs are so made as to deliver during consumption, the quality of light desired, that is, the relative proportions of ultra-violet and infrared rays.

In the drawings forming a part hereof:—

Fig. 1 is a longitudinal section of a preferred form of apparatus for carrying out the method or process.

Figs. 2 and 3 are sections on the lines 2—2 and 3—3 respectively, of Fig. 1.

In the embodiment of the apparatus shown, a room or casing 1 is provided, in which the apparatus is arranged, the said room being of a suitable size and closed, but having doors at about the middle of each side, sufficiently large to permit the entrance of the operator, and an opening in each end for the passage of the conveyors which carry the tobacco to and from the treating apparatus.

Within the room, a drum 2 is mounted, the said drum being a cylinder, preferably of copper, and it is supported for rotation on its long axis. The drum has rings 3 near its ends, which rest upon grooved rollers 4, the rings engaging within the grooves, as shown in Fig. 1. The rollers are supported by a suitable frame 5 on the floor of the room.

In practice, the floor of the room is formed by the floor of the building in which the room is arranged, and the room may be of sheet iron, suitably painted inside, as for instance, dull black, to reduce the amount of reflection from openings in the drum. The rollers 4 are arranged to be rotated, whereby to drive the drum, and they are driven from a suitable source of power, as for instance, an electric motor, indicated at 6.

A belt 7 connects the shaft of the motor with a pulley on a shaft 9, which is connected by gearing 10 with a shaft 11 extending axially of the drum, and one set of rollers 4 is mounted on the shaft, it being understood that the rollers are arranged in sets, a set at each end of the drum. The ends of the drum 2 are closed by heads 12 and 13, the said heads being fixed, and the drum rotates between the heads. The heads have annular flanges 14, within which the ends of the drum engage, so that there is a relatively tight closure between the heads and the drum, to prevent the escape of light. The interior of the drum is preferably polished or lined to provide a reflecting surface and is provided with pins 15 arranged in sets, the members of each set extending axially of the drum, and the sets being staggered or offset with respect to each other, as shown in Fig. 1. These pins are for the purpose of lifting the tobacco which is fed into the drum, carrying it up to near the top of the drum, and allowing it to fall to the bottom of the drum.

Referring to Fig. 1, it will be seen that the drum is tilted slightly, the inlet end being at a higher level than the outlet end, and the tobacco is fed into the high end, by means of an endless conveyor 16, which is supported on rollers 17, one of which is supported by the head 12 inside the same, the conveyor extending through an opening in the head. A hood 18 covers the conveyor, the said hood extending through the head 12, and through the adjacent end of the room 1, as shown. At its outer end it is provided with a feed hopper 19, and the hood and the rollers are supported by a subframe 20.

The tobacco is delivered on to the inner face of the drum, and travels slowly down to the lower end, where it is delivered upon a second conveyor 21, supported by rollers 22, mounted in a subframe 23, which also carries a hood 24. Both conveyors 16 and 21 are inclined in the same direction, the conveyor 18 inclining upwardly toward the drum, while the inner end of the conveyor 21 is arranged below the lower end of the drum, and inclines upwardly from the drum. The head 13 has an opening at 25 through which the tobacco passes upon the upper run of the conveyor.

The conveyor 21 is driven from the shaft 9 through a belt 26, connecting pulleys on the shafts 9 and on the shaft of the innermost roller 22. A belt 27 connects the shaft 22 above mentioned, with a shaft 28, which in turn is connected by a belt 29 with a shaft 30, the shaft 30 being connected to the shaft of the innermost roller 17 by a belt 31. It will be understood that suitable pulleys are provided on the shafts of the rollers 17 and 22, and on the shafts 28 and 30.

With this arrangement, the tobacco fed into the hopper 19 will be carried into the drum through the head 12, and will be delivered onto that part of the inner surface of the drum which is lowest at the moment. The tobacco will be carried up by the pins 15 and dropped a number of times, by the different sets of pins, but will eventually reach the opening 25, and be delivered to the conveyor 21. As the tobacco travels through the cylinder, it is subjected to the action of the rays of light from light sources to be described, and the arrangement is such that substantially every part thereof is subjected to the impact of the rays.

A pair of hoods is arranged at the outer side of each head. Each hood consists of a part 32 secured to the adjacent head, and a part 33, which is hinged to swing toward and away from the part 32. The parts 32 of the hoods are tubular, and each head 12 and 13 has an opening indicated at 34, through which the rays of light may pass from the sources, mounted in the parts 33 of the hoods to the interior of the drum. Sliding doors 35 are provided for closing the openings 34, each door sliding in guides on the head, and having in connection therewith a counterweight 37 to balance the door, so that it may be easily opened and closed. As shown, the counterweights are connected to the doors by cords 38, passing over pulleys 39 in the room ceiling.

A battery of lamps is mounted in the part 33 of each hood, and it has been found that three lights of the character to be described are preferable. Thus there are six lights at each end of the hood, and twelve in all. The lights are ultraviolet lights, and each is provided with a suitable reflector, as for instance, a chromium plated reflector. The hoods at each end are screened from each other, so that light will not shine from one into the adjacent hood, when for any reason the hood is open for adjustment. The movable part of each hood is held in closed position by a spring latch 33a, and in practice a contact switch is provided for controlling the circuits to the bank of lights in connection with each hood, so arranged that when the movable part 33 is open, the circuit of the lamps will be open, and when the part 33 is closed, the lamp circuit will be closed.

As shown, the lamps are carbon arcs, each having, as usual, two carbons 40, which preferably are of special construction, as for instance, the therapeutic c carbon of the National Carbon Co. Inc. The reflector 42 plated with chromium or the like, is arranged directly behind the carbons, and any suitable adjusting means is provided for enabling adjustment of the carbons toward and from each other. The hood of each bank of lights is ventilated by means of a hose 43, extending from the part 33 of the hood to a connection with one of the arms of a branch 44 from a header 45, supported from the ceiling of the room. A suitable fan may be connected with the outer end of the header, and this fan should be of a capacity to exhaust approximately 600 cubic feet of air from each bank of lamps. A second hose 50 connects the header at each end of the drum with the interior thereof, the inner end of each hose passing through the adjacent head.

By means of the exhaust through the header 45, the temperature of the drum, and the temperature of the hoods may be nicely controlled. In each of the heads 12 and 13, peep openings 51 are provided, each of which is covered with India ruby mica and ordinary window glass, to protect the eyes of anyone looking through the peep opening. The ends of the room 45 are provided with similar openings, in order that the operation of the drum may be observed from outside the room. However, it is advisable to use welder's goggles when working about the plant, to protect the eyes from accidental burns. If desired, the exhaust from the drum may be connected with a separate and independent fan or exhaust apparatus, so that the temperature in the drum and the temperature in the room may be independently regulated.

In operation, with the drum operating, and the lights burning properly, tobacco is fed into the hopper 19, and by the conveyor 16, is delivered to the drum. The tobacco is lifted and dropped by the sets of pins 15 in succession and is thus turned over and over, as it travels through the drum, so that substantially every part thereof is subjected to the action of light rays from the ultra-violet lamps. The speed of rotation of the drum and the inclination thereof is adjusted in accordance with the time during which it is desired that the tobacco remain in the drum, that is, under treatment. The moisture content of the tobacco is regulated to between about 8% to 18%, and the temperature during treatment is raised to above 70° F. This temperature increases the solubility of the salts, and the rate of diffusion of the salts through the plant cells. The temperature may reach 150°, and the treatment of light may last from one to fifteen minutes, according to the condition of the tobacco. The length of treatment is also proportional to the power of the lamp or to the number of lamps used.

The part 33 of each hood is pivotally mounted, the mounting being indicated at 60. The mounting is on a subframe 62 or 63, as the case may be, the subframe 62 being at the inlet end of the drum, while the subframe 63 is at the outlet end. The arrangement is such that when the hood is opened, it is swung away from the part 32, this swinging movement being clearly indicated in Fig. 2. The latch 40 previously referred to, is at the outer side of the hood, and at the inner side the part 33 closes against a stop 65.

In order to prevent sparks from the carbon igniting the tobacco in the drum, a baffle 66 is arranged in the fixed part 32 of each hood in inclined position, and so placed that any sparks discharged by the carbons will strike the baffle and be prevented from entering the drum. It will be understood that tobacco in any form may be treated, as for instance, in the leaf, or partially manufactured, as for instance in strips or shreds, and that the word "leaf" or "leaves" as employed in the specification and claims is intended to cover the tobacco in any of such forms and is not employed in a restriction sense.

As herein stated the time of exposure of the tobacco to the light rays may be from about one to fifteen minutes and the temperature in the treatment chamber from about 70° F. to 150° F., while the moisture content of the tobacco during treatment should be from 8 to 18 per cent. I have obtained most satisfactory results by exposing tobacco having a moisture content of about 12% to ultra-violet light rays for a period of about one minute or less and at a temperature of about 138° F., although the temperature within the chamber may vary from about 130° F. to 148° F. Under these conditions of operation I have found that the moisture content of the tobacco is not appreciably reduced during its passage thru the treatment chamber, the reduction being not more than about one per cent. This is important because the tobacco when leaving the chamber, and especially shredded cigarette tobaccos, is in excellent condition, so far as its moisture content is concerned, to be manufactured into cigarettes, and without further moistening. Therefore an important feature of my improved process resides in so regulating the conditions of operation and the time of exposure of the tobacco to the light rays that the moisture content of the tobacco is not appreciably reduced.

No claim is made herein to the apparatus illustrated and described, as such apparatus is claimed in co-pending application Serial No. 645,137 filed November 30, 1932, now Patent No. 1,926,036, dated September 12, 1933.

What is claimed as new is:—

1. The method of treating cured and aged tobacco, which consists in subjecting the tobacco to the action of light rays containing a selected proportion of ultra-violet rays, while continuously changing the position of the tobacco with respect to the rays to subject substantially every part thereof to the action of the rays and without appreciably reducing its moisture content.

2. The method of treating cured and aged tobacco, which consists in subjecting the tobacco to the action of light rays containing selected proportions of ultra-violet and infrared rays while moving the tobacco through the rays in a manner such that substantially every part of the surface thereof is subjected to the action of the rays, and without appreciably reducing its moisture content.

3. The method of treating cured and aged tobacco, which consists in ionizing certain chemical compounds in the plant cells by regulation of the moisture content and the temperature to selected points, and treating the tobacco with light rays including a selected proportion of ultra-violet rays, while moving the tobacco through the rays in a manner such that substantially every part of the surface thereof is subjected to the action of the rays, and without appreciably reducing its moisture content.

4. The method of treating cured and aged tobacco, which consists in ionizing certain chemical compounds in the plant cells by regulation of the moisture content and the temperature to selected points, and treating the tobacco with light rays including selected proportions of ultra-violet and infrared rays, while moving the same through the rays in a manner such that substantially every part of the surface of the tobacco is subjected to the action of the rays, and without appreciably reducing its moisture content.

5. The method of treating cured and aged tobacco, which consists in ionizing certain chemical compounds in the plant cells by regulation of the moisture content and the temperature to selected points, and treating the tobacco in this condition with light rays containing selected proportions of ultra-violet and infrared rays, and without appreciably reducing its moisture content.

6. The method of treating cured and aged tobacco, which consists in ionizing certain chemical compounds in the plant cells by regulation of the moisture content to a selected point, and treating the tobacco in this condition with light rays containing selected proportions of ultra-violet and infrared rays, and without appreciably reducing its moisture content.

7. The method of treating cured and aged tobacco, which consists in ionizing certain chemical compounds in the plant cells by regulation of the moisture content to a selected point, and treating the tobacco in this condition with light rays containing selected proportions of ultra-violet and infrared rays, while moving the tobacco through the rays in one direction and continually changing the position thereof with respect to the direction of the rays.

8. The method of treating cured and aged tobacco, which consists in ionizing certain chemical compounds in the plant cells by regulation of the moisture content to a selected point, and treating the tobacco in this condition with light rays containing selected proportions of ultra-violet and infrared rays, by passing the tobacco through the rays in the direction thereof, and turning them over and over during their passage.

9. The method of treating cured and aged tobacco, which consists in ionizing certain chemical compounds in the plant cells by regulation of moisture content to a selected point, and treating the tobacco in this condition with light rays containing selected proportions of ultra-violet and infrared rays, while moving the tobacco in a manner to insure subjection of substantially every part thereof to the rays, and without appreciably reducing its moisture content.

10. The method of treating cured and aged tobacco, which consists in advancing the tobacco through a closed chamber to the action of ultra-violet and infrared rays, while turning the tobacco over and over, to cause every part thereof to be subjected to the action of the rays, and circulating air of a character such as not to materially reduce the moisture content of the tobacco passing through the chamber.

11. The method of treating cured and aged tobacco, which consists in continuously advancing the tobacco through a closed chamber in the action of ultra-violet and infrared rays, while turning the tobacco over and over, to cause every part thereof to be subjected to the action of the rays, and circulating through the chamber air sufficient to remove deleterious products of combustion, but of a character such that the moisture content of the tobacco is not materially reduced during treatment.

12. The herein-described continuous method of treating cured and aged tobacco, which consists in continuously advancing a stream of tobacco through a chamber flooded with ultra-violet rays and in turning the tobacco over and over during its movement through the chamber so that substantially all portions of the tobacco will be exposed to the rays.

13. The herein-described continuous method of treating cured and aged tobacco, which consists in continuously advancing a stream of tobacco having a known moisture content through a chamber flooded with ultra-violet rays and in turning the tobacco over and over during its movement through the chamber, the conditions of operation and the time of exposure of the tobacco to the light rays being such that the moisture content of the tobacco will not be appreciably reduced.

ALMOND L. CHESLEY.